United States Patent [19]

Panlaqui et al.

[11] 4,122,754
[45] Oct. 31, 1978

[54] DEPENDENT SWAY BRACING WEAPON RESTRAINTS

[75] Inventors: Clayton E. Panlaqui; Lloyd J. Holt, both of Ridgecrest, Calif.

[73] Assignee: The United States of America as represented by the Secretary of the Navy, Washington, D.C.

[21] Appl. No.: 822,125

[22] Filed: Aug. 5, 1977

[51] Int. Cl.² ............................................. F41F 5/02
[52] U.S. Cl. ................................ 89/1.5 B; 244/137 R
[58] Field of Search ............... 89/1.5 B, 1.5 R, 1.5 G; 244/137 R

[56] References Cited

U.S. PATENT DOCUMENTS

| 2,010,511 | 8/1935 | Crawford | 89/1.5 B |
| 2,461,406 | 2/1949 | Birk et al. | 89/1.5 B |
| 3,670,620 | 6/1972 | Paraskewik | 85/1.5 B |

FOREIGN PATENT DOCUMENTS

| 829,085 | 3/1938 | France | 89/1.5 B |
| 574,948 | 1/1946 | United Kingdom | 89/1.5 B |

OTHER PUBLICATIONS

Technical Disclosure Bulletin, vol. 1, No. 2, by Leslie P. Robinson, pp. 37–41, Jun. 1976.

Primary Examiner—David H. Brown
Attorney, Agent, or Firm—R. S. Sciascia; Roy Miller

[57] ABSTRACT

Automatic sway brace mechanism for restraining stores mounted on an aircraft. Cam actuated paired sets of sway braces terminating in store engaging pads are arranged to provide a positive self-centering force equalization arrangement wherein said sway brace mechanism is automatically moved from a retracted to a store engaging position and back to a retracted position under positive control.

7 Claims, 3 Drawing Figures

DEPENDENT SWAY BRACING WEAPON RESTRAINTS

BACKGROUND OF THE INVENTION

1. Field of the Invention

Store racks used on high performance aircraft have become highly sophisticated devices which many times require great care and time in loading. Typically, the operation of loading a store onto an external bomb rack involves pre-stressing a set of sway braces, usually four per bomb, by means of individually torqued bolts at the end of each sway brace to a predetermined torque level. This puts the bomb suspension into tension by using up all the clearness and provides a rigid connection to restrain the bomb from pivoting. Consequently, precise torque readings are necessary in order to insure the structural limits of the bomb suspension mechanism are not exceeded.

After the store is released, the sway brace mechanism generally remains fixed in a projecting position from the streamline contour of the aircraft and produces considerable drag.

2. Description of the Prior Art

Typical examples of prior art sway brace mechanisms are illustrated in U.S. Pat. Nos. 2,552,578 and 3,670,620. The sway brace mechanism shown in U.S. Pat. No. 2,552,578 is arranged such that upon release of the store the sway brace mechanism is retractable to a position within the streamline contour of the aircraft. However, as shown in FIG. 5, the individual sway brace pads must be manually adjusted to accomodate different store sizes.

U.S. Pat. No. 3,670,620 addresses the problem of individual adjustment of the sway brace pads however, the sway brace mechanism is not retractable within the streamline of the aircraft.

SUMMARY OF THE INVENTION

The present invention comprises a sway brace mechanism to provide weapon restraint, which is self-centering and may be retracted to a position completely free of the airstream when not in use. The sway brace mechanism comprises a pair of sway brace arms which terminate in store engaging pads. The individual arms are interconnected by means of a cam mechanism which is driven by a rack and pinion mechanism. The sway brace mechanism automatically adapts to different store sizes and when not in use is retracted back within the confines of the pylon or store rack.

DESCRIPTION OF THE PREFERRED EMBODIMENT

Figure 1:
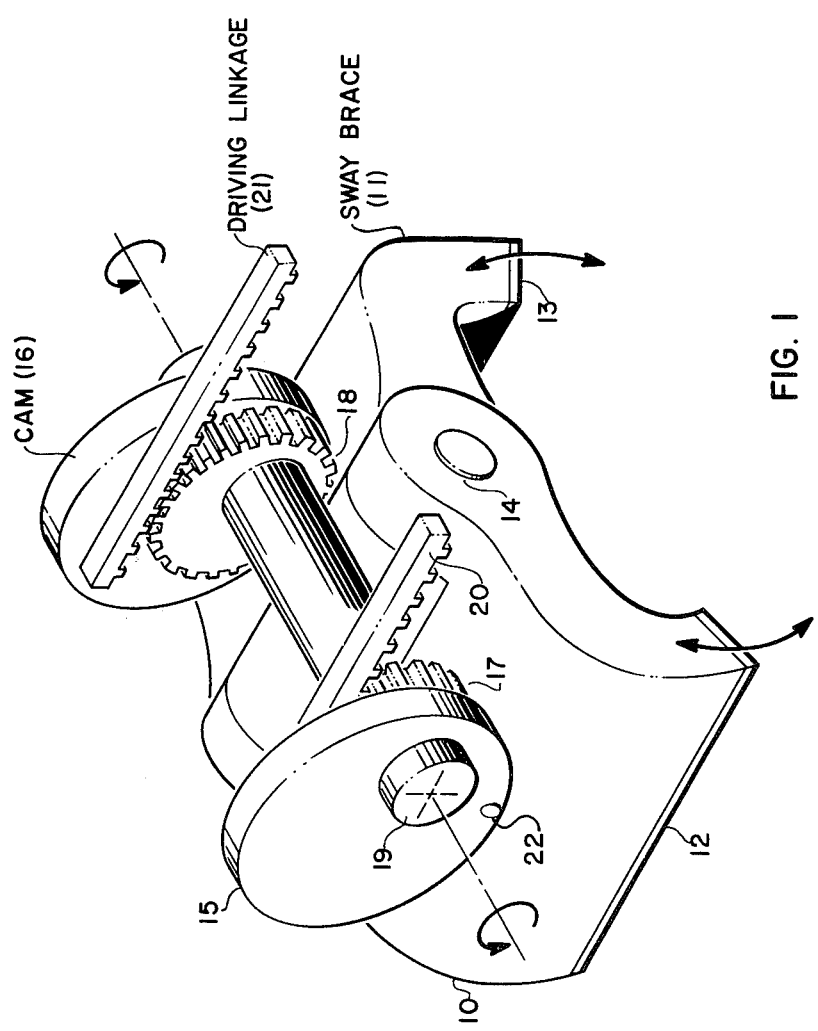
FIG. 1 is an assembly drawing of one embodiment of the sway brace mechanism.

FIG. 1 illustrates one embodiment of the automatic sway brace mechanism which incorporates sway brace arms 10 and 11 terminating in store engaging pads 12 and 13 respectively. The arms 10 and 11 are interconnected and rotate about pin 14.

The arms 10 and 11 are driven by means of cams 15 and 16 which engage the top surface of sway brace arms 10 and 11 respectively. Fixed to cams 15 and 16 are pinions 17 and 18 respectively which are in turn journaled on axle 19 as are the cams 15 and 16. Pinions 17 and 18 engage rack members 20 and 21 respectively.

As stated previously, the sway brace arms 10 and 11 are driven downwardly with respect to FIG. 1 by engagement of cams 15 and 16. The arms may be retracted by having the arms spring loaded, one with respect to the other, or cams 15 and 16 might engage a slot in the arms 10 and 11 respectively and be pinned thereto. For instance, pin 22 carried by cam 15 would engage a slot, not shown, in arm 10. Cam 16 would also carry a pin which would ride in a slot on arm 11. Then, as the cams are rotated by the rack and pinion mechanism, the arms would be retracted. The means whereby the sway brace mechanism is affixed to the store rack or pylon is not shown as it forms no part of the present invention.

Figure 2:
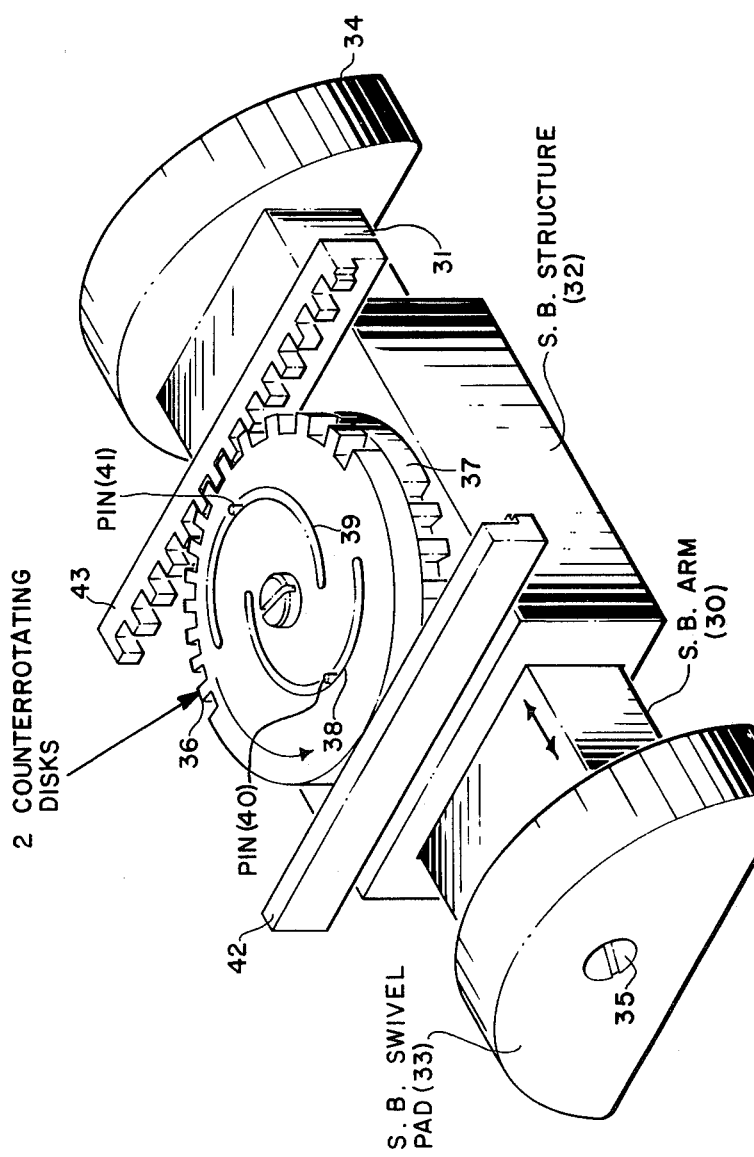
FIG. 2 is an assembly drawing of another embodiment of the sway brace mechanism.

FIG. 2 illustrates another embodiment of the present invention wherein sway brace arms 30 and 31 are carried by sway brace structure 32 so that the arms 30 and 31 slide in slots cut in the structure 32. The arms terminate in sway brace swivel pads 33 and 34 respectively. The pads are held on the arms by means of bolts, one of which is shown at 35.

The arms are driven laterally back and forth by means of two counter rotating toothed disks 36 and 37. Cam slots as at 38 and 39 are milled or machined in each one of the respective disks and a pin as at 40 and 41 rides in the respective slot 38 and 39. Pins 40 and 41 are connected to respective arms 30 and 31 so that as the disks 36 and 37 are rotated the sway brace arms 39 and 31 will be driven laterally.

The disks 36 and 37 are driven by respective racks 42 and 43. Again, none of the structure which connects the sway brace mechanism to the pylon or store rack is shown as it forms no part of the present invention.

Figure 3:
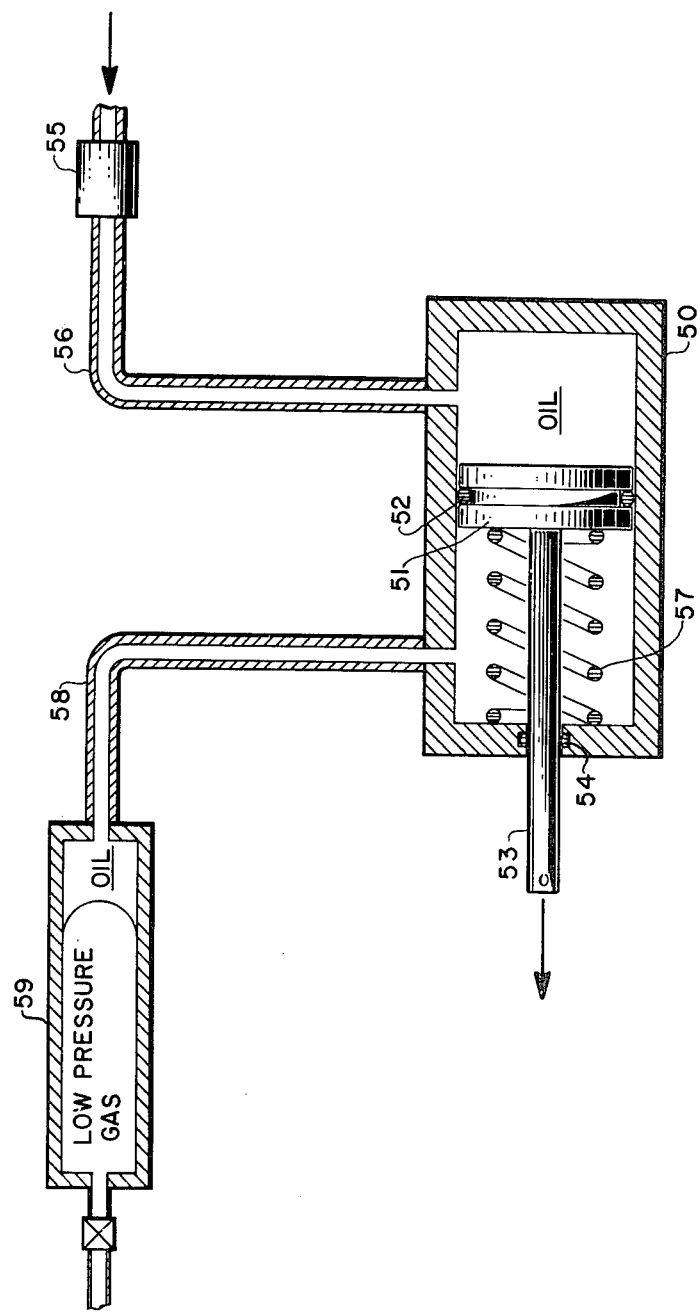
FIG. 3 is a view in cross section of a hydraulic mechanism for driving the rack and pinion.

FIG. 3 illustrates a hydraulic mechanism which might be used for driving the rack and pinion mechanism of FIGS. 1 and 2. The hydraulic mechanism comprises a cylinder 50 having a piston 51 internally thereof. The piston is sealed with respect to the cylinder 50 by means of O ring 52. A connecting rod 53 which is connected to the piston 51 extends through one end of cylinder 50 and is sealed with respect thereto by means of O ring 54.

A motive fluid is introduced from a hydraulic source such as on an aircraft system or from the release mechanism of co-pending U.S. Application Ser. No. 797,897, filed May 17, 1977, or from a dependent ejector retraction system. The motive fluid is introduced through a valve 55 which is connected to the cylinder 50 by means of a conduit 56.

A spring 57 surrounds the piston rod 53 and bears against the piston and the end of the cylinder through which the piston rod passes. Contained within the same area as the spring is oil under low pressure which is connected by means of tubing 58 to a secondary power accumulator 59 which contains a low pressure gas and oil.

In operation, a store is lifted up against the sway bracing and into position onto the pylon or the store rack. Oil under pressure is introduced into piston 50 and the piston 51 moves slightly to the left, thereby also driving the piston rod 53 to the left in FIG. 3. Piston rod 53 is connected to the driving linkage i.e., the racks of FIG. 1 and FIG. 2. Movement of the racks causes the cams to be moved with in turn moves the sway brace pads against the store. At the same time, the piston displacement compresses spring 57 slightly and also compresses the low pressure gas in the accumulator 59.

If the store is released manually such as aboard an aircraft carrier, the compressed gas and the spring reposition the piston within the housing and cause the sway brace mechanism driving linkage to return to its initial position thereby retracting the sway brace arms.

When the store is normally ejected such as from an aircraft, hydraulic fluid from a hydraulic source aboard the aircraft or the release mechanism of co-pending U.S. patent application Ser. No. 797,897 filed May 17, 1977 or a dependent ejector retraction system causes fluid to flow into the cylinder 50. This in turn, causes the piston to move to the left in FIG. 3 which drives the racks which cause the sway brace mechanism to follow-through the complete downward motion. This is due to the fact that the piston is displaced its full stroke and spring 57 and the accumulator 59 are at maximum compression and pressure respectively. When the ejector system retracts, oil is returned to the release mechanism by pressure from the spring and accumulator thereby moving the piston 51 to its initial position. As the piston 51 moves to its initial position it retracts the sway brace driving linkage thereby restoring the sway brace to the maximum up position into the pylon or store rack out of the airstream.

The present dependent sway brace mechanism may be manually, semiautomatic or automatically operated. When not in use it is contained with the envelope of the pylon or store rack. The mutual dependency of the sway braces allows for simultaneous extension for loading a store on the pylon or store rack. The mutual dependency inherently self-aligns or self-centers the store. Over tightening of one or more brace is prevented because the restraining forces are equally distributed to the braces. The braces are maintained in a pre-loaded condition in operation to prevent opening once they are actuated. After release, the pre-load closes or retracts the braces.

Various advantages flow from the use of the present structure, one of which is simultaneous extention of the braces. Others are, no manual tightening is required of the individual sway brace pads, dependency of the braces balances reaction loads and a store is self-centered on the pylon or store rack. Also, the sway brace mechanism is automatically retracted after release of the store.

What is claimed is:

1. An automatic sway brace mechanism for an aircraft carrying a releaseable store comprising:
   a mechanism including a pair of movable arms terminating in store engaging pads;
   said arms being movable from a retracted to a store engaging position;
   cam means in engagement with said arms and operative to drive said arms from the retracted to the store engaging position and back to the retracted position;
   cam driving means for driving said cam means;
   said sway brace mechanism being automatically self-centering and accommodating different store sizes without individual manual adjustment of the arms or pads.

2. An automatic sway brace mechanism as set forth in claim 1 and further including;
   rack and pinion means comprising said cam driving means.

3. An automatic sway brace mechanism as set forth in claim 2 wherein;
   said pinion means of said rack and pinion means is formed on said cam means.

4. An automatic sway brace mechanism as set forth in claim 3 wherein;
   said pinion means of said rack and pinion means is separate from and interconnected with said cam means.

5. An automatic sway brace mechanism as set forth in claim 4 and further including;
   positively controlled drive means operatively connected to said rack means for causing movement of said rack means.

6. An automatic sway brace mechanism as set forth in claim 5 wherein;
   said positively controlled drive means is a hydraulic mechanism.

7. An automatic sway brace mechanism as set forth in claim 6 wherein;
   said hydraulic mechanism comprises a piston and cylinder arrangement.

* * * * *